US010965626B2

(12) United States Patent
Han et al.

(10) Patent No.: US 10,965,626 B2
(45) Date of Patent: Mar. 30, 2021

(54) ELECTRONIC DEVICE AND METHOD FOR SCHEDULING TRIP FOR CAR SHARING SERVICE

(71) Applicants: Hyundai Motor Company, Seoul (KR); Kia Motors Corporation, Seoul (KR)

(72) Inventors: Jimin Han, Anyang-si (KR); Anastasia Yarygina, Seoul (KR); Jung Mi Park, Anyang-si (KR); Jia Lee, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 222 days.

(21) Appl. No.: 16/059,916

(22) Filed: Aug. 9, 2018

(65) Prior Publication Data
US 2019/0132268 A1 May 2, 2019

(30) Foreign Application Priority Data
Nov. 1, 2017 (KR) .................. 10-2017-0144916

(51) Int. Cl.
*H04L 12/58* (2006.01)
*G06F 40/289* (2020.01)
(Continued)

(52) U.S. Cl.
CPC ........ *H04L 51/046* (2013.01); *G01C 21/3438* (2013.01); *G06F 40/289* (2020.01);
(Continued)

(58) Field of Classification Search
CPC ...................................................... H04L 51/18
See application file for complete search history.

(56) References Cited

U.S. PATENT DOCUMENTS

2013/0086229 A1* 4/2013 Misolin ................ H04L 67/306
709/219
2016/0292596 A1 10/2016 Gaitan et al.
(Continued)

FOREIGN PATENT DOCUMENTS

| KR | 10-2012-0135611 A | 12/2012 |
| WO | WO 2015/077634 A1 | 5/2015 |
| WO | WO 2017/088161 A1 | 6/2017 |

*Primary Examiner* — Glenford J Madamba
(74) *Attorney, Agent, or Firm* — Morgan, Lewis & Bockius LLP

(57) ABSTRACT

An electronic device may include a communication circuit, a touch screen display, and a processor configured to be electrically connected to the communication circuit and the touch screen display wherein the processor provides a chat screen for displaying a chat among a plurality of users including a user of the electronic device and a user of at least one external device using the communication circuit and the touch screen display, obtains a time keyword associated with a pick-up time and a place keyword associated with a pick-up place by analyzing text data displayed on the chat screen, and, when inputs of all of the plurality of users are provided to a confirmation button included in the chat screen, provides a question screen for inquiring whether the plurality of users agree on the pick-up time and the pick-up place.

20 Claims, 8 Drawing Sheets

(51) Int. Cl.
*G06Q 10/02* (2012.01)
*G06Q 50/30* (2012.01)
*G01C 21/34* (2006.01)

(52) U.S. Cl.
CPC ............ *G06Q 10/02* (2013.01); *G06Q 50/30* (2013.01); *H04L 51/04* (2013.01); *H04L 51/18* (2013.01)

(56) References Cited

U.S. PATENT DOCUMENTS

| | | |
|---|---|---|
| 2016/0320198 A1 | 11/2016 | Liu et al. |
| 2016/0321566 A1 | 11/2016 | Liu et al. |
| 2017/0061561 A1* | 3/2017 | Cha ................ H04W 4/023 |
| 2017/0250936 A1* | 8/2017 | Rosenberg ............ H04L 51/18 |
| 2017/0339523 A1* | 11/2017 | Hamahata ............ H04W 4/023 |
| 2018/0129645 A1* | 5/2018 | Grant .................... G06F 40/35 |
| 2018/0374002 A1* | 12/2018 | Li ............................ G06F 3/017 |

* cited by examiner

ELECTRONIC DEVICE AND METHOD FOR SCHEDULING TRIP FOR CAR SHARING SERVICE

CROSS-REFERENCE TO RELATED APPLICATION

The present application claims priority to Korean Patent Application No. 10-2017-0144916, filed on Nov. 1, 2017, in the Korean Intellectual Property Office, the entire contents of which is incorporated herein for all purposes by this reference.

BACKGROUND OF THE INVENTION

Field of the Invention

The present invention relates to an apparatus and method for scheduling a trip for a plurality of users when providing a vehicle sharing service.

Description of Related Art

Recently, there has been a growing interest in a service (hereinafter referred to as "car sharing service" for convenience of description), such as vehicle sharing, a vehicle pool, or vehicle hailing, which may use vehicles of service providers or vehicles of others through a simple procedure. The vehicle sharing service may be provided through a personal device of a user. For example, the user may input information related to a trip he or she wants and may share a vehicle matched with the input information, using the vehicle sharing service. The vehicle sharing service may be for providing a service which allows a plurality of users who input a similar trip to share one vehicle with each other or one another.

If a service for allowing the plurality of users to share one vehicle with each other or one another is provided, a process of grouping the users (including a driver) to share the vehicle such that the grouped users agree on a schedule may be requested. However, it is inadequate to develop a user interface for grouping users and agreeing on a schedule.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a user interface configured for allowing a plurality of users to easily agreeing on a schedule in a vehicle sharing service and efficiently grouping the users.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an electronic device may include: a communication circuit configured to communicate with at least one external device, a touch screen display configured to display an image and receive a touch input, and a processor configured to be electrically connected to the communication circuit and the touch screen display. The processor is configured to provide a chat screen for displaying a chat among a plurality of users including a user of the electronic device and a user of the at least one external device using the communication circuit and the touch screen display, obtain a time keyword associated with a pick-up time and a place keyword associated with a pick-up place by analyzing text data displayed on the chat screen, and, when inputs of all of the plurality of users are provided to a confirmation button included in the chat screen, provide a question screen for inquiring whether to agree on the pick-up time and the pick-up place.

In an exemplary embodiment of the present invention, the processor may be configured to provide the chat screen for displaying the chat among the plurality of users who select the same trip as each other.

In an exemplary embodiment of the present invention, the processor may be configured to change a color of the confirmation button included in the chat screen based on the number of users who provide their inputs to the confirmation button included in the chat screen among the plurality of users.

In an exemplary embodiment of the present invention, the processor may be configured to obtain a time keyword and a place keyword which are displayed last among a plurality of time keywords and a plurality of place keywords, which are displayed on the chat screen, by analyzing the text data displayed on the chat screen.

In an exemplary embodiment of the present invention, the processor may be configured to display one or more time keywords and one or more place keywords, which are displayed on the chat screen, on a partial region of the chat screen by analyzing the text data displayed on the chat screen.

In an exemplary embodiment of the present invention, the processor may be configured to change a color of the confirmation button included in the chat screen based on a proportion of users who provide their inputs to the confirmation button included in the chat screen among the plurality of users.

In an exemplary embodiment of the present invention, the question screen may include a slot for inputting the pick-up time, an agree button for the pick-up time, a slot for inputting the pick-up place, and an agree button for the pick-up place.

In an exemplary embodiment of the present invention, the question screen may include a slot for displaying the time keyword as the pick-up time, an agree button for the pick-up time, a slot for displaying the place keyword as the pick-up place, and an agree button for the pick-up place.

In an exemplary embodiment of the present invention, the processor may be configured to provide a pre-questionnaire screen for classifying users who select the same trip as each other into a plurality of groups and provide the chat screen for displaying the chat among the plurality of users included in one of the plurality of groups.

In an exemplary embodiment of the present invention, the pre-questionnaire screen may include one or more questionnaires and an agree button for each of the one or more questionnaires.

In an exemplary embodiment of the present invention, the one or more questionnaires may include a questionnaire about at least one of a range configured for adjusting a pick-up time, a range configured for adjusting a pick-up location, and a type of a desired vehicle.

In an exemplary embodiment of the present invention, the processor may be configured to change a color of the confirmation button included in the question screen based on the number of users who provide their inputs to the confirmation button included in the question screen among the plurality of users.

In an exemplary embodiment of the present invention, the processor may be configured to determine the pick-up time and the pick-up place based on inputs of the plurality of users to the question screen.

In an exemplary embodiment of the present invention, the processor may be configured to, after the pick-up time and the pick-up place are determined, provide information related to at least one of a distance between the plurality of users or a distance between destinations of each of the plurality of users.

In an exemplary embodiment of the present invention, the processor may be configured to, after the pick-up time and the pick-up place are determined, provide an additional chat screen for displaying a chat among at least some of the plurality of users.

In an exemplary embodiment of the present invention, the processor may be configured to, when an input is provided to an object included in the additional chat screen, transmit a chat included in the additional chat screen to a device of a driver.

According to various aspects of the present invention, a method may include: providing a chat screen for displaying a chat among a plurality of users, obtaining a time keyword associated with a pick-up time and a place keyword associated with a pick-up place by analyzing text data displayed on the chat screen, and, when inputs of all of the plurality of users are provided to a confirmation button included in the chat screen, providing a question screen for inquiring whether to agree on the pick-up time and the pick-up place.

In an exemplary embodiment of the present invention, the method may further include changing a color of the confirmation button included in the chat screen based on the number of users who provide their inputs to the confirmation button included in the chat screen among the plurality of users.

In an exemplary embodiment of the present invention, the method may further include determining the pick-up time and the pick-up place based on inputs of the plurality of users to the question screen.

According to various aspects of the present invention, a computer storage medium may store instructions executable by at least one processor included in an electronic device. The instructions may cause the at least one processor to provide a chat screen for displaying a chat among a plurality of users, obtain a time keyword associated with a pick-up time and a place keyword associated with a pick-up place by analyzing text data displayed on the chat screen, and, when inputs of all of the plurality of users are provided to a confirmation button included in the chat screen, provide a question screen for inquiring whether to agree on the pick-up time and the pick-up place.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
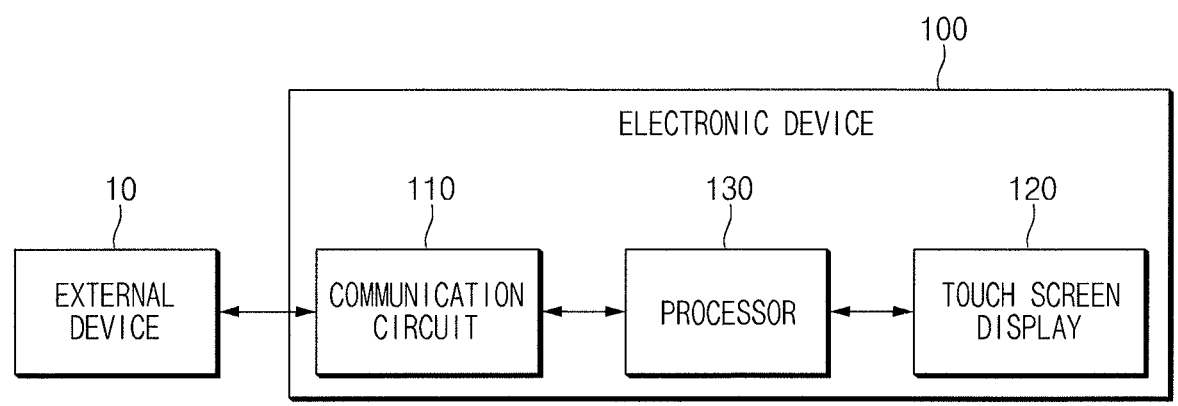
FIG. 1 is a block diagram illustrating a configuration of an electronic device according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, embodiments of the present invention will be described in detail with reference to the accompanying drawings. In adding reference denotations to elements of each drawing, although the same elements are displayed on a different drawing, it may be noted that the same elements have the same denotations. In addition, in describing an exemplary embodiment of the present invention, if it is determined that a detailed description of related well-known configurations or functions blurs the gist of an exemplary embodiment of the present invention, it will be omitted.

In describing elements of embodiments of the present invention, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an electronic device according to an exemplary embodiment of the present invention.

Referring to FIG. 1, an electronic device 100 according to an exemplary embodiment of the present invention may include a communication circuit 110, a touch screen display 120, and a processor 130. The electronic device 100 may be one of various personal devices, for example, a desktop, a laptop, a smartphone, a tablet personal computer (PC), or a wearable device.

The communication circuit 110 may be configured to communicate with an external device 10. In FIG. 1, in an exemplary embodiment of the present invention, the communication circuit 10 communicates with the one external device 10. However, embodiments are not limited thereto. For example, the communication circuit 110 may communicate with a plurality of external devices. The communication circuit 110 may communicate with the external device 10 via a server, a mediation device, and/or the like. The communication circuit 110 may communicate with a service provider system which provides a vehicle sharing service.

The touch screen display 120 may be configured to display an image. The touch screen display 120 may be configured to receive a touch input by a finger of a user or the like.

The processor 130 may be electrically connected to the communication circuit 110 and the touch screen display 120. The processor 130 may control the communication circuit 110 and the touch screen display 120 and may perform a variety of data processing and various arithmetic operations.

According to an exemplary embodiment of the present invention, the processor 130 may provide a chat screen for displaying a chat among a plurality of users including a user of the electronic device 100 and a user of the at least one external device 10 using the communication circuit 110 and the touch screen display 120. The processor 130 may provide a chat screen for displaying a chat among a plurality of users who select the same trip as each other. For example, the processor 130 may provide a chat screen for displaying a chat among users who selects the same trip as each other among a plurality of trips uploaded to a webpage or the like. The processor 130 may display a chat input by the plurality of users on the chat screen.

According to an exemplary embodiment of the present invention, the processor 130 may obtain a time keyword associated with a pick-up time and a place keyword associated with a pick-up place by analyzing text data displayed on the chat screen. For example, the processor 130 may obtain a keyword including time information and a keyword including place information using a previously stored dictionary. The processor 130 may obtain a keyword for a path, a destination, and/or the like.

According to an exemplary embodiment of the present invention, the processor 130 may obtain a time keyword and a place keyword which are displayed last among a plurality of time keywords and a plurality of place keywords, which are displayed on a chat screen, by analyzing text data displayed on the chat screen. For example, the processor 130 may obtain a keyword which is input last among a plurality of keywords.

According to an exemplary embodiment of the present invention, the processor 130 may display one or more time keywords and one or more place keywords, which are displayed on a chat screen, on a partial region of the chat screen by analyzing text data displayed on the chat screen. For example, the processor 130 may display an obtained keyword on an upper end portion of the chat screen.

According to an exemplary embodiment of the present invention, the processor 130 may change a color of a configuration button included in a chat screen based on the number of users which provide their inputs to the configuration button included in the chat screen among a plurality of users. When agreement on a trip is completed, the chat screen may include a confirmation button for proceeding to a next process. The processor 130 may change a color of the confirmation button included in the chat screen based on a proportion of users who provide their inputs to the confirmation button included in the chat screen among the plurality of users. For example, when there is no user who provides his or her input to the confirmation button, the processor 130 may display the confirmation button in white. When users who provide their inputs to the confirmation button increase in number, the processor 130 may display the confirmation button to become darker and darker. When all of the plurality of users provide their inputs to the confirmation button, the processor 130 may display the confirmation button in black.

According to an exemplary embodiment of the present invention, when the inputs of all of the plurality of users are provided to the confirmation button included in the chat screen, the processor 130 may provide a question screen for inquiring whether to agree on a pick-up time and a pick-up place for the plurality of users. For example, the question screen may include a slot for inputting a pick-up time, an agree button for the pick-up time, a slot for inputting a pick-up place, and an agree button for the pick-up place. In the instant case, the slot may display information input by one of the plurality of users. For another example, the question screen may include a slot for displaying a time keyword as a pick-up time, an agree button for the pick-up time, a slot for displaying a place keyword as a pick-up place, and an agree button for the pick-up place. In the instant case, the slot may display a keyword obtained by analyzing text data displayed on a chat screen.

According to an exemplary embodiment of the present invention, the processor 130 may change a color of a confirmation button included in a question screen based on the number of users who provide their inputs to the confirmation button included in the question screen among the plurality of users. The processor 130 may change a color of the confirmation button included in the question screen in a similar manner to a confirmation button included in a chat screen.

According to an exemplary embodiment of the present invention, the processor 130 may determine a pick-up time and a pick-up place based on inputs of the plurality of users to a question screen. For example, when inputs of all of the plurality of users are provided to an agree button or a confirmation button, the processor 130 may determine a pick-up time and a pick-up place displayed on a slot.

According to an exemplary embodiment of the present invention, the processor 130 may provide a pre-questionnaire screen for classifying users who select the same trip as each other into a plurality of groups and may provide a chat screen for displaying a chat among a plurality of users included in one of the plurality of groups. The pre-questionnaire screen may include, for example, one or more questionnaires and an agree button for each of the one or more questionnaires. The one or more questionnaires may include, for example, a range configured for adjusting a pick-up time, a range configured for adjusting a pick-up location, and a questionnaire for at least one of types of desired vehicles. The service provider system may classify users who input the same response to one or more questionnaires among users who select the same trip as each other into the same group. The processor 130 may provide a chat screen for displaying a chat among the users classified into the same group.

According to an exemplary embodiment of the present invention, after the pick-up time and the pick-up place are determined, the processor 130 may provide information related to at least one of a distance between a plurality of users or a distance between destinations of each of the plurality of users. The processor 130 may display a list of the plurality of users and may display a distance between the plurality of users and/or a distance between destinations on the list.

According to an exemplary embodiment of the present invention, after the pick-up time and the pick-up place are determined, the processor 130 may provide an additional chat screen for displaying a chat among at least some of the plurality of users. The processor 130 may provide an additional chat screen for displaying a chat between the user of the electronic device 100 and another user selected by the user of the electronic device 100.

According to an exemplary embodiment of the present invention, when an input is provided to an object included in the additional chat screen, the processor 130 may transmit a chat included in the additional chat screen to a device of a driver. When an input is provided to an object for transmitting a chat, the processor 130 may transmit the chat to the device of the driver using the communication circuit 110.

Figure 2:
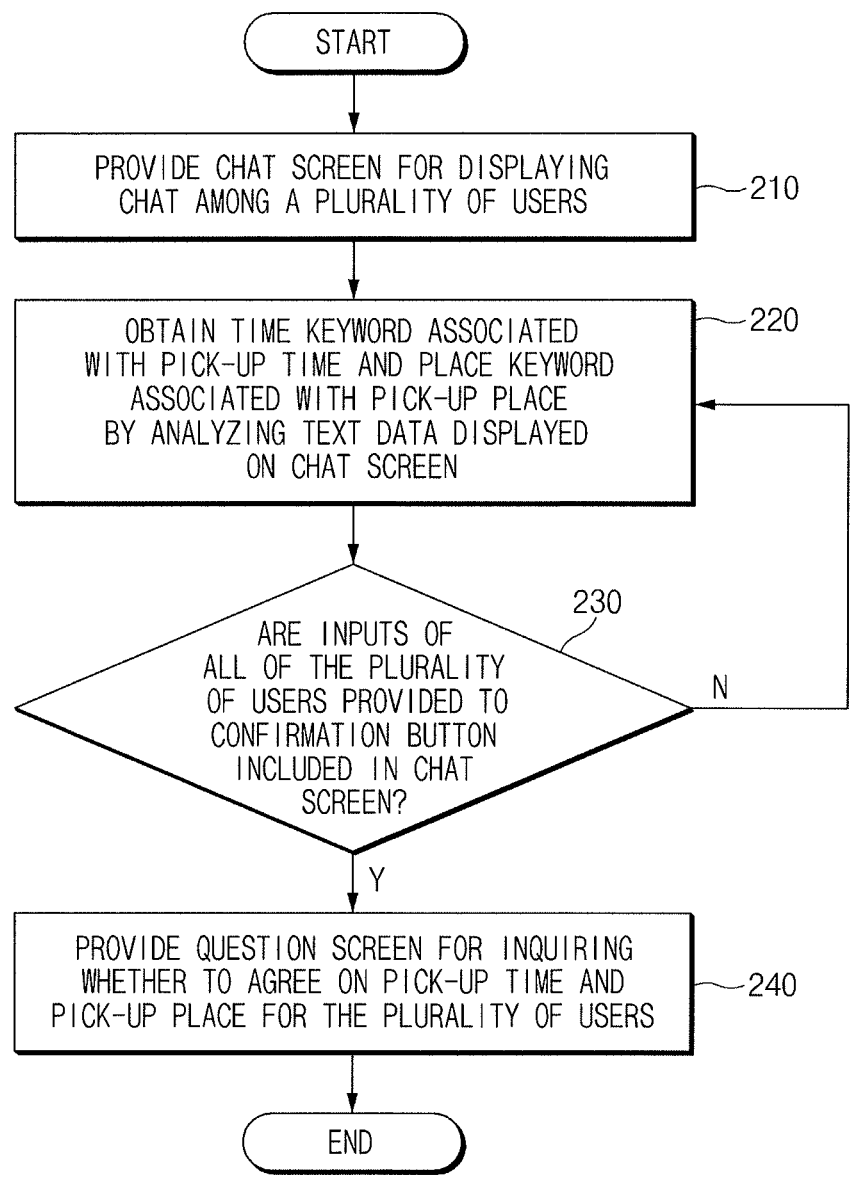
FIG. 2 is a flowchart illustrating a method for scheduling a trip for a vehicle sharing service according to an exemplary embodiment of the present invention.

FIG. 2 is a flowchart illustrating a method for scheduling a trip for a vehicle sharing service according to an exemplary embodiment of the present invention.

Hereinafter, it may be assumed that an electronic device 100 of FIG. 1 performs a process of FIG. 2. Furthermore, in a description of FIG. 2, an operation referred to as being performed by an electronic device may be understood as being controlled by a processor 130 of the electronic device 100.

Referring to FIG. 2, in operation 210, the electronic device may provide a chat screen for displaying a chat among a plurality of users. For example, the electronic device may provide a chat screen such that users who select the same trip as each other may plan a detailed schedule.

In operation 220, the electronic device may obtain a time keyword associated with a pick-up time and a place keyword associated with a pick-up place by analyzing text data displayed on the chat screen. For example, the electronic device may extract a time keyword and a place keyword from text data using a dictionary database.

In operation 230, the electronic device may determine whether inputs of all of the plurality of users are provided to a confirmation button included in the chat screen. For example, the electronic device may change a color of the confirmation button based on the number of users who provide their inputs to the confirmation button.

When the inputs of all the plurality of users are provided to the confirmation button, in operation 240, the electronic device may provide a question screen for inquiring whether to agree on the pick-up time and the pick-up place for the plurality of users. For example, the electronic device may display the pick-up time and place on the question screen and may display an agree button configured for selecting whether to agree on the pick-up time and place.

Figure 3:
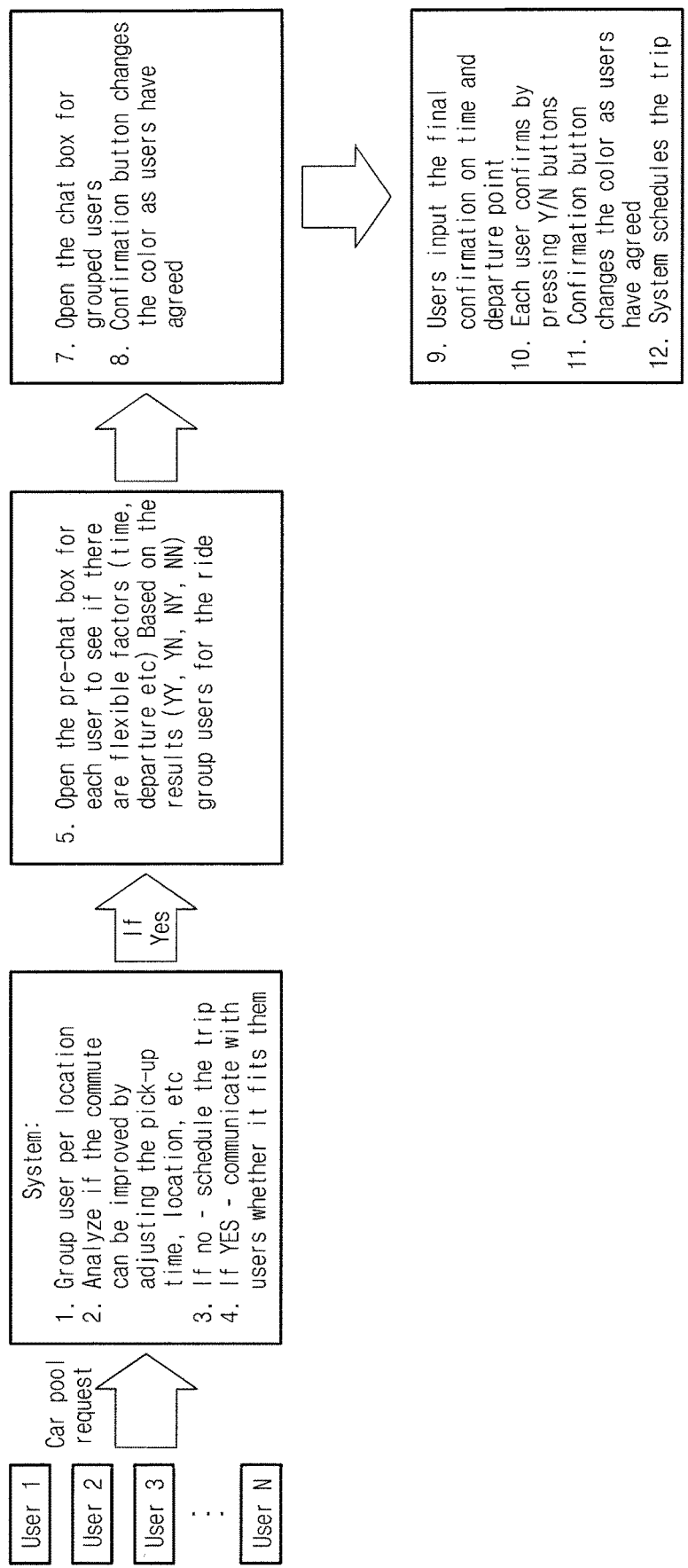
FIG. 3 is a drawing illustrating a method for scheduling a trip for a vehicle sharing service according to an exemplary embodiment of the present invention.

FIG. 3 is a drawing illustrating a method for scheduling a trip for a vehicle sharing service according to an exemplary embodiment of the present invention.

Hereinafter, it may be assumed that a system for providing a vehicle sharing service performs a process of FIG. 3.

Referring to FIG. 3, the system may group users who request to car-pool based on their locations. The system may analyze whether it is possible for a commute to be improved by adjusting a pick-up time, a pick-up location, and/or the like. When it is impossible for the commute to be improved, the system may schedule a trip of users. When it is possible for the commute to be improved, the system may perform an operation for adjusting a trip among the users.

The system may open a pre-questionnaire screen (e.g., a pre-chat box) to know whether it is possible to adjust a time, a departure point, a destination point, and/or the like. The system may group users again depending on responses of the users to questionnaires included in the pre-questionnaire screen.

The system may provide a chat screen for the grouped users. When a user expresses agreement by providing his or her input to a confirmation button, the system may change a color of the confirmation button.

The system may finally verify the time and the departure point based on an input of the user. The system may verify the time and the departure point based on an input of the user to a Y/N button. When the user expresses agreement by providing his or her input to the confirmation button, the system may change a color of the confirmation button. When all of users finally confirm the time and the departure point, the system may schedule a trip of the users.

Figure 4:
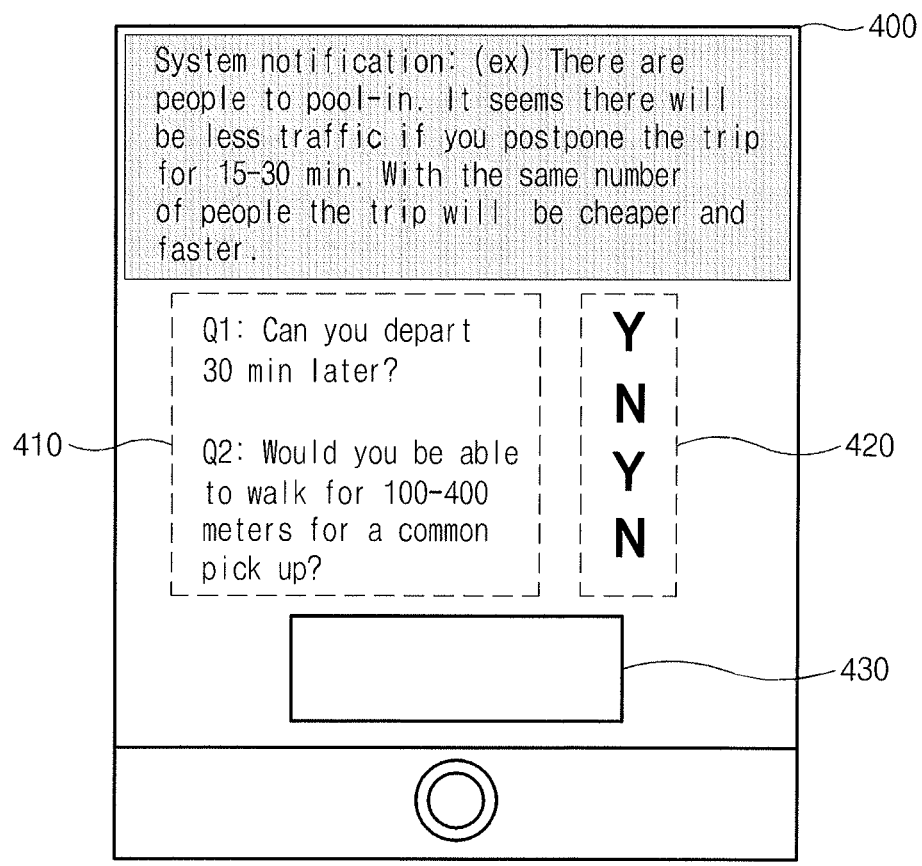
FIG. 4 is a drawing illustrating an exemplary operation of an electronic device according to an exemplary embodiment of the present invention.

FIG. 4 is a drawing illustrating an exemplary operation of an electronic device according to an exemplary embodiment of the present invention.

Referring to FIG. 4, the electronic device may provide a pre-questionnaire screen 400. The pre-questionnaire screen 400 may include, for example, a questionnaire 410 for inquiring whether it is possible for a user to depart 30 minutes later and whether he or she is able to walk for 100 meters to 400 meters for a common pick-up. The pre-questionnaire screen 400 may include an agree button (e.g., a Y/N button) 420 for the questionnaire 410 and a confirmation button 430. When all users provide their inputs to the agree button 420 (or the agree button 420 and the confirmation button 430), a service provider system may group the users based on the inputs to the agree button 420. For example, the service provider system may group users who provide the same response to the questionnaire. The electronic device may change a color of the confirmation button based on the number of users who provide their inputs to the agree button 420 or the confirmation button 430. When all the users provide their inputs to the agree button 430 or the confirmation button 430, the electronic device may provide a chat screen shown in FIG. 5.

Figure 5:
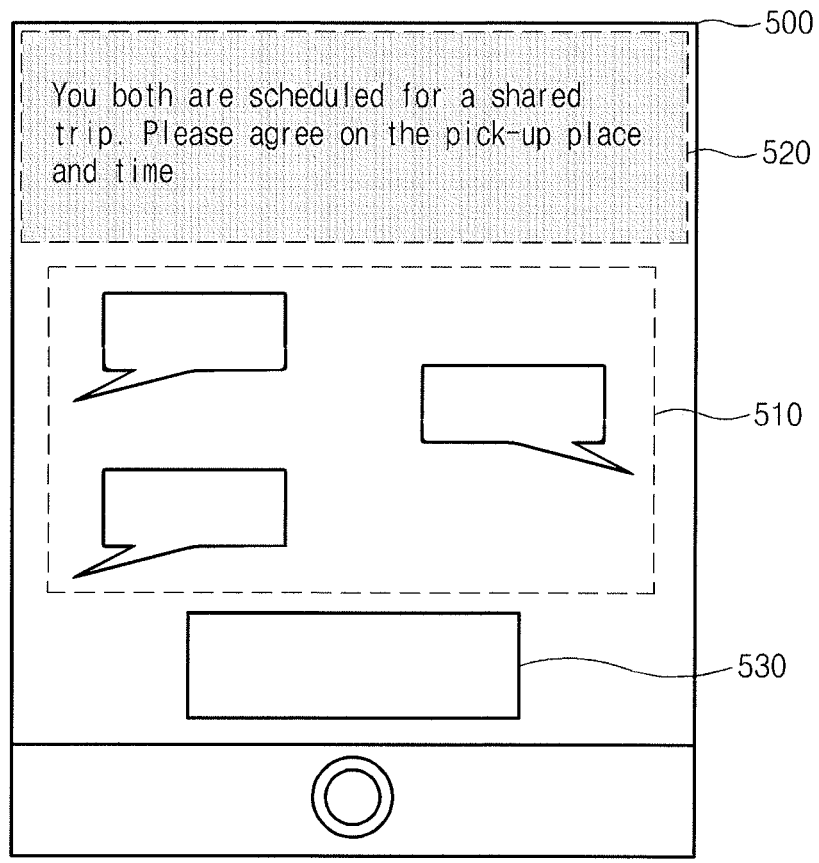
FIG. 5 is a drawing illustrating an exemplary operation of an electronic device according to an exemplary embodiment of the present invention.

FIG. 5 is a drawing illustrating an exemplary operation of an electronic device according to an exemplary embodiment of the present invention.

Referring to FIG. 5, the electronic device may provide a chat screen 500. The electronic device may provide the chat screen 500 for a chat among grouped users. The grouped users may include a driver. The electronic device may obtain a time keyword and a place keyboard by analyzing a chat 510 among the users included in the chat screen 500. The electronic device may obtain a time keyword and a place keyword which are displayed last among a plurality of time keywords and a plurality of place keywords, which are included in the chat 510, and may display all time keywords and all place keywords, which are included in the chat 510, on an upper region 520 of the chat screen 500. The chat screen 500 may include a confirmation button 530. The electronic device may change a color of the confirmation button 530 based on the number of users who provide their inputs to the confirmation button 530. When all users provide their inputs to the confirmation button 530, the electronic device may provide a questionnaire screen shown in FIG. 6.

Figure 6:
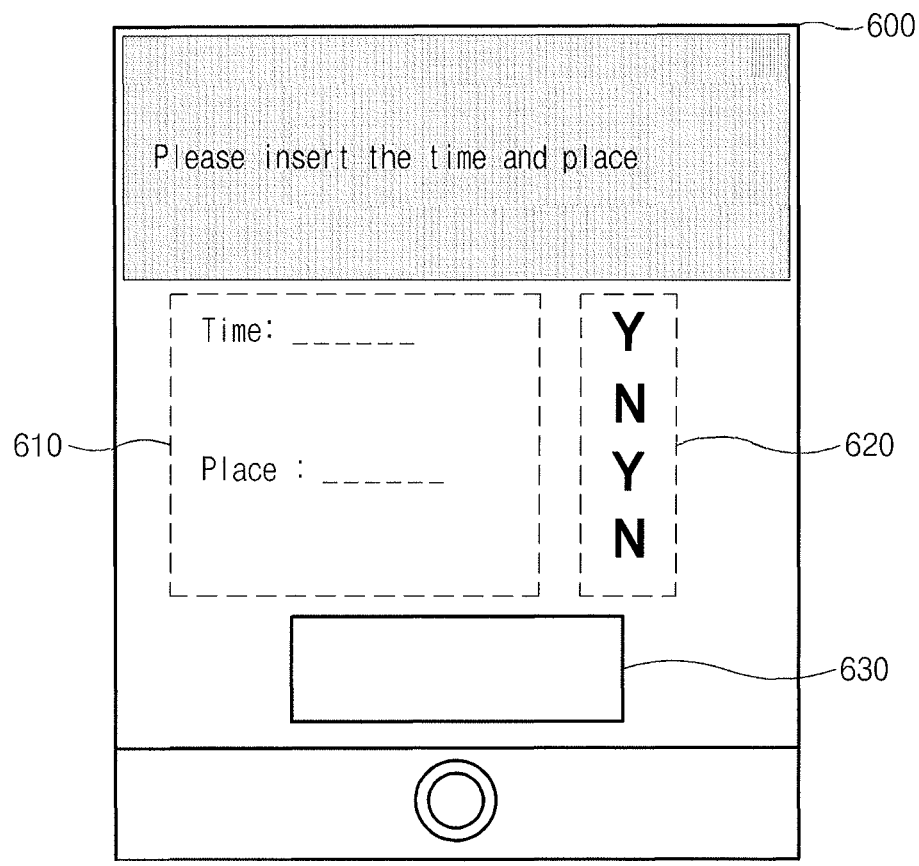
FIG. 6 is a drawing illustrating an exemplary operation of an electronic device according to an exemplary embodiment of the present invention.

FIG. 6 is a drawing illustrating an exemplary operation of an electronic device according to an exemplary embodiment of the present invention.

Referring to FIG. 6, the electronic device may provide a questionnaire screen 600. The questionnaire screen 600 may include, for example, a plurality of slots 610, an agree button (e.g., a Y/N button) 620 for each of the plurality of slots 610, and a confirmation button 630. The plurality of slots 610 may display a pick-up time and a pick-up place. The plurality of slots 610 may display a pick-up time and a pick-up place input by a user or may display a time keyword and a place keyword obtained by analyzing a chat screen. When all users provide their inputs to the agree button (or the agree button 620 and the confirmation button 630), a service provider system may determine a trip of the users. The electronic device may change a color of the confirmation button 630 based on the number of users who provide their inputs to the agree button 620 or the confirmation button 630. When all the users provide their inputs to the agree button 620 or the confirmation button 630, the electronic device may determine a trip of the users. When the trip is determined, the electronic device may display a list shown in FIG. 7.

Figure 7:
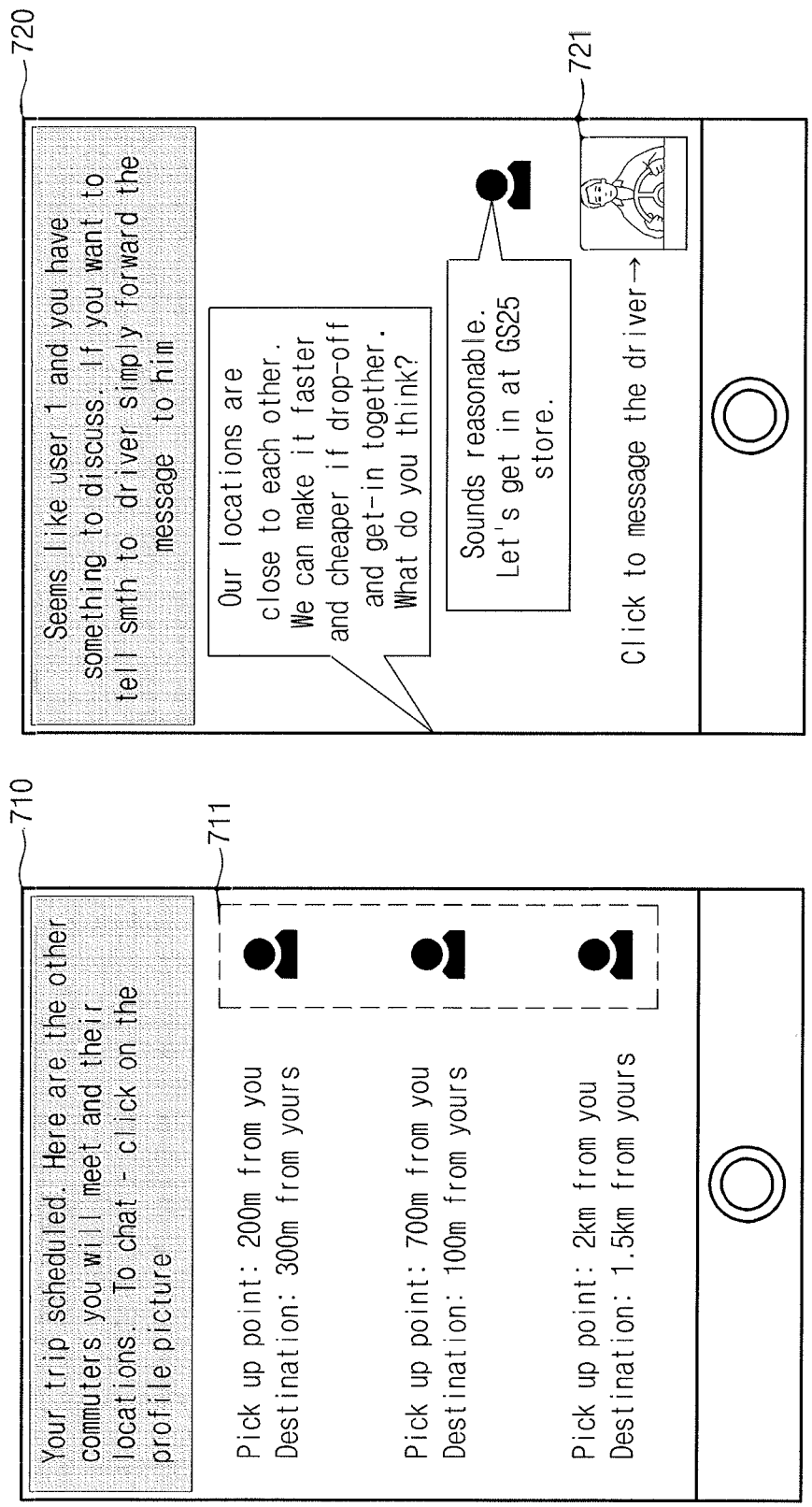
FIG. 7 is a drawing illustrating an exemplary operation of an electronic device according to an exemplary embodiment of the present invention.

FIG. 7 is a drawing illustrating an exemplary operation of an electronic device according to an exemplary embodiment of the present invention.

Referring to FIG. 7, the electronic device may display a list 710 of users included in a determined trip. The electronic device may display a distance between a pick-up point and destination of its user and each of pick-up points and destinations of users included in the list 710 on the list 710. When an input is provided to one of objects 711 included in the list 710, the electronic device may provide a chat screen 720 with a user corresponding to the object. The chat screen 720 may include an object 721. When an input is provided to the object 721, the electronic device may transmit a chat included in the chat screen 720 to a device of a driver.

Figure 8:
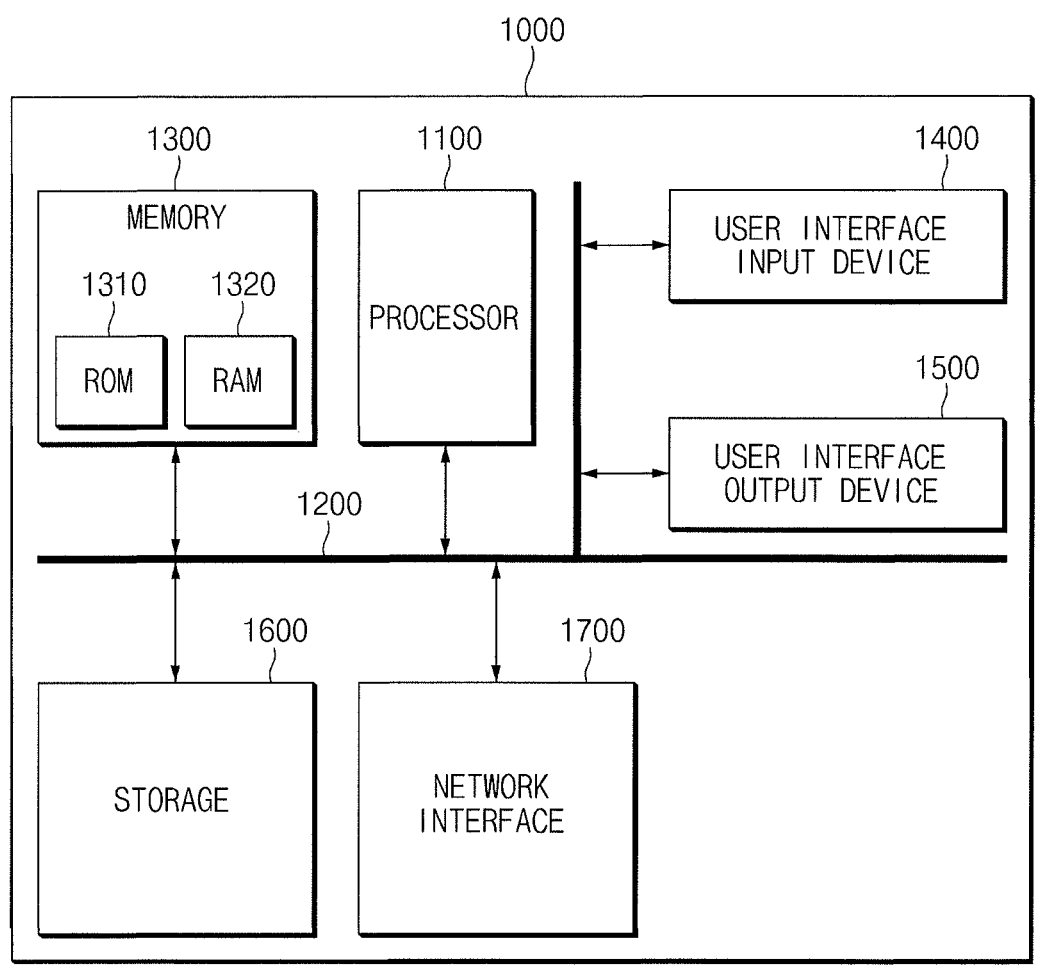
FIG. 8 is a block diagram illustrating a configuration of a computing system according to an exemplary embodiment of the present invention.

FIG. 8 is a block diagram illustrating a configuration of a computing system according to an exemplary embodiment of the present invention.

Referring to FIG. 8, the above-mentioned user input processing method according to an exemplary embodiment of the present invention may be implemented through the computing system. A computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The electronic device and the method according to an exemplary embodiment of the present invention may provide a chat screen configured for automatically obtaining keywords for a pick-up place, a pick-up time, a path, a destination, and/or the like and easily determining the agreement or disagreement of a plurality of users.

Furthermore, various effects indirectly or directly ascertained through the present invention may be provided.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic device, comprising:
 a communication circuit connected to at least one external device and configured to communicate with the at least one external device;
 a touch screen display configured to display an image and receive a touch input;
 a non-transitory storage medium configured to store instructions; and
 a processor configured to be electrically connected to the communication circuit and the touch screen display,
 wherein the processor is configured to, by executing the instructions:
 provide a chat screen for displaying a chat among a plurality of users including a user of the electronic device and a user of the at least one external device using the communication circuit and the touch screen display;

obtain a time keyword including a pick-up time and a place keyword including a pick-up place by analyzing text data displayed on the chat screen;

display the time keyword and the place keyword on an upper end portion of the chat screen; and when inputs of all of the plurality of users are provided to a confirmation button included in the chat screen, provide a question screen for inquiring whether to agree on the pick-up time and the pick-up place.

2. The electronic device of claim 1, wherein the processor is configured to:

provide the chat screen for displaying the chat among the plurality of users who select a same trip as each other.

3. The electronic device of claim 1, wherein the processor is configured to:

change a color of the confirmation button included in the chat screen based on a number of users who provide inputs of the users to the confirmation button included in the chat screen among the plurality of users.

4. The electronic device of claim 1, wherein the processor is configured to:

obtain a time keyword and a place keyword which are displayed last among a plurality of time keywords and a plurality of place keywords, which are displayed on the chat screen, by analyzing the text data displayed on the chat screen.

5. The electronic device of claim 1, wherein the processor is configured to:

display one or more time keywords and one or more place keywords, which are displayed on the chat screen, on a partial region of the chat screen by analyzing the text data displayed on the chat screen.

6. The electronic device of claim 3, wherein the processor is configured to:

change a color of the confirmation button included in the chat screen based on a proportion of users who provide inputs of the users to the confirmation button included in the chat screen among the plurality of users.

7. The electronic device of claim 1, wherein the question screen includes:

a slot for inputting the pick-up time;
an agree button for the pick-up time;
a slot for inputting the pick-up place; and
an agree button for the pick-up place.

8. The electronic device of claim 3, wherein the question screen includes:

a slot for displaying the time keyword as the pick-up time;
an agree button for the pick-up time;
a slot for displaying the place keyword as the pick-up place; and
an agree button for the pick-up place.

9. The electronic device of claim 1, wherein the processor is configured to:

provide a pre-questionnaire screen for classifying users who select a same trip as each other into a plurality of groups; and provide the chat screen for displaying the chat among the plurality of users included in one of the plurality of groups.

10. The electronic device of claim 9, wherein the pre-questionnaire screen includes one or more questionnaires and an agree button for each of the one or more questionnaires.

11. The electronic device of claim 10, wherein the one or more questionnaires include a questionnaire about at least one of a range configured for adjusting a pick-up time, a range configured for adjusting a pick-up location, and a type of a desired vehicle.

12. The electronic device of claim 1, wherein the processor is configured to:

change a color of the confirmation button included in the question screen based on a number of users who provide inputs of the users to the confirmation button included in the question screen among the plurality of users.

13. The electronic device of claim 1, wherein the processor is configured to:

determine the pick-up time and the pick-up place based on inputs of the plurality of users to the question screen.

14. The electronic device of claim 1, wherein the processor is configured to:

after the pick-up time and the pick-up place are determined, provide information related to at least one of a distance between the plurality of users or a distance between destinations of each of the plurality of users.

15. The electronic device of claim 1, wherein the processor is configured to:

after the pick-up time and the pick-up place are determined, provide an additional chat screen for displaying a chat among a predetermined number of the plurality of users.

16. The electronic device of claim 15, wherein the processor is configured to:

when an input is provided to an object included in the additional chat screen, transmit a chat included in the additional chat screen to a device of a driver.

17. A method for scheduling a trip for a vehicle sharing service, the method comprising:

providing a chat screen for displaying a chat among a plurality of users;

obtaining a time keyword including a pick-up time and a place keyword including a pick-up place by analyzing text data displayed on the chat screen;

displaying the time keyword and the place keyword on an upper end portion of the chat screen; and when inputs of all of the plurality of users are provided to a confirmation button included in the chat screen, providing a question screen for inquiring whether to agree on the pick-up time and the pick-up place.

18. The method of claim 17, further including:

changing a color of the confirmation button included in the chat screen based on a number of users who provide inputs of the users to the confirmation button included in the chat screen among the plurality of users.

19. The method of claim 17, further including:

determining the pick-up time and the pick-up place based on inputs of the plurality of users to the question screen.

20. A non-transitory computer storage medium storing instructions executable by at least one processor included in an electronic device, the instructions for causing the at least one processor to:

provide a chat screen for displaying a chat among a plurality of users;

obtain a time keyword including a pick-up time and a place keyword including a pick-up place by analyzing text data displayed on the chat screen; and display the time keyword and the place keyword on an upper end portion of the chat screen: and when inputs of all of the plurality of users are provided to a confirmation button included in the chat screen, provide a question screen for inquiring whether to agree on the pick-up time and the pick-up place.

\* \* \* \* \*